C. B. WHITMOYER.
REMOVABLE BLADE FOR CUTTER BARS.
APPLICATION FILED DEC. 10, 1920.
1,384,933.
Patented July 19, 1921.
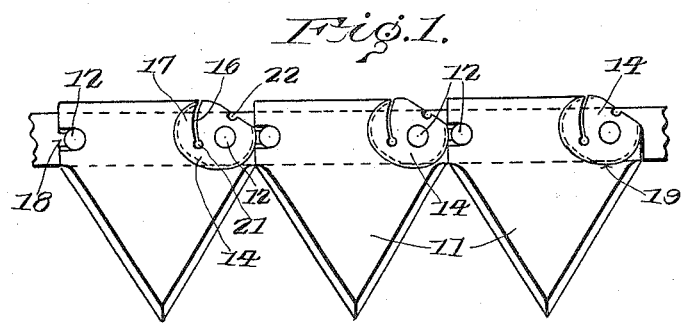
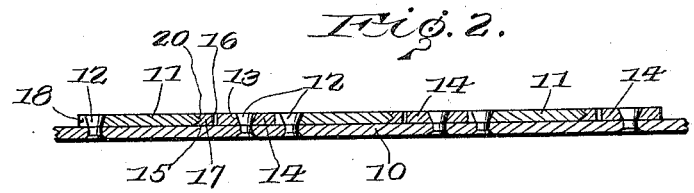
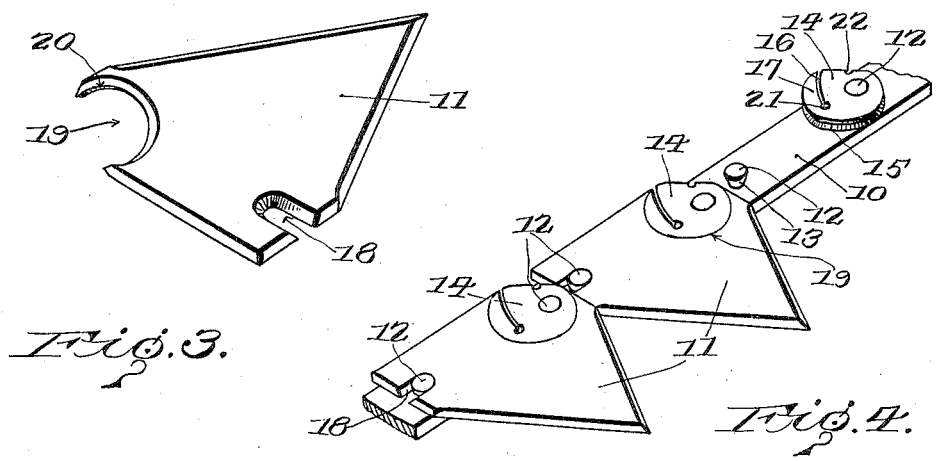
Charles B. Whitmoyer, INVENTOR.

UNITED STATES PATENT OFFICE.

CHARLES B. WHITMOYER, OF MUNCY, PENNSYLVANIA.

REMOVABLE BLADE FOR CUTTER-BARS.

1,384,933.      Specification of Letters Patent.      Patented July 19, 1921.

Application filed December 10, 1920. Serial No. 429,700.

*To all whom it may concern:*

Be it known that I, CHARLES B. WHITMOYER, a citizen of the United States, residing at Muncy, in the county of Lycoming, State of Pennsylvania, have invented certain new and useful Improvements in Removable Blades for Cutter-Bars; and I do hereby declare the following to be a full, clear, and exact description of the invention, such as will enable others skilled in the art to which it appertains to make and use the same.

This invention relates to new and useful improvements in mower cutter bars, and particularly to the knives therefor.

The principal object of the invention is to provide a cutter bar knife which can be easily and quickly removed from the bar to permit proper sharpening, and as easily replaced on the bar.

Another object is to provide a means for holding the knife on the bar which is in the nature of a spring wedge which frictionally engages with the knife.

Other objects and advantages will be apparent from the following description when taken in connection with the accompanying drawing.

In the drawing:

Figure 1 is a plan view of a portion of a mower cutter bar equipped with my improved knives and holding means therefor.

Fig. 2 is a vertical longitudinal sectional view through the teeth and cutter bar, longitudinally of the bar, to show the manner in which the fastening means coöperates with the knife.

Fig. 3 is a perspective view of the knife removed from the bar.

Fig. 4 is a perspective view of the bar and fastening means, one of the knives being removed.

Referring particularly to the accompanying drawing, 10 represents the cutter bar of a mower on which are secured the triangular knives 11.

Disposed vertically through the bar are the pairs of studs 12 each having an undercut or beveled head 13. Rotatably carried by one of the studs 12 is a cam disk 14 the greater portion of the peripheral edge face of which has formed the V-shaped or otherwise formed groove 15. Formed in the cam, and opening through one side thereof, is a curved slot 16 which produces the tapered finger 17 at the portion of the cam remote from the pivot thereof.

The cutter blade is of the same general contour as the ordinary blade except that the stem has a laterally extending open-ended slot or recess 18 with the walls beveled upwardly, said recess being thus formed to snugly receive the head and stem of the other bolt or stud 12. The knife blade is adapted to be slipped into place by a movement longitudinally of the bar 10. In the opposite side of the stem of the blade there is formed a large curved recess 19 which is adapted to receive the cam therein. The walls of this recess 19 are double beveled to form the knife edge 20 which is received in the groove 15 of the cam disk 14. The inner end of the slot 16 is slightly enlarged at 21, while a similar opening is formed at 22, at a distance from the first one and at the same distance at the other side of the center of the cam. Into these openings are received the pins of a tool by means of which the disk is turned within the recess.

When the disk is in released position, the blade can be slipped under the first stud, and then permitted to drop onto the face of the cutter bar. In thus dropping the blade the cam disk will be received in the larger recess 19 of the stem of the blade. Then, upon inserting the pins of the tool in the openings 21 and 22 the disk may be rotated until the edge 20 enters the groove of the disk. Further turning of the disk causes the finger 17 to be flexed toward the body of the disk with the result that a firm frictional engagement is had between the disk and the walls of the recess 19. The blade is thus tightly held on the cutter bar and will not be jarred loose during the operation of the cutter.

By providing the removable blades it is possible to more accurately and conveniently sharpen the cutting edges of the blades. Ordinarily the blades are riveted to the bar and the entire bar, with the blades must be manipulated at the sharpening stone or other grinding device. This is an unwieldy method, and is unsatisfactory in its results, in that the edges of the blades cannot be properly presented to the grinding device, the sharpening of the blades thus being a mere makeshift operation. With the blades rendered removable, each individual blade can be handled and properly manipulated against the grinding device, with the result that a good clean cutting edge will be produced.

What is claimed is:

1. The combination with a cutter bar of a headed member carried by the bar, a removable cutter blade having a recess for receiving said headed member, and a resilient rotatable locking means carried by the bar and arranged to frictionally engage the other side of the blade to maintain the blade in engagement with said headed member.

2. The combination with a cutter bar, of a headed member carried by the bar, a removable cutter blade having a stem formed with a recess receiving said headed member, and a rotatable resilient cam carried by the bar and arranged to frictionally engage the other side of the stem of the blade.

3. The combination with a cutter bar of a headed member carried by the bar, a removable cutter blade having a stem formed with a recess in one side receiving the headed member and a larger recess in the opposite side, and a rotatable resilient cam carried by the bar and engageable in the said larger recess to hold the blade in position on the bar.

4. The combination with a cutter bar, of a headed member carried by the bar, a removable cutter blade carried by the bar having a stem disposed on the bar, said stem having formed in one side a recess receiving the headed member and a larger recess in the opposite side thereof, the walls of the larger recess being double beveled outwardly to form a knife edge, and a rotatable resilient cam carried by the bar, and engageable in the recess, said cam having a peripheral groove receiving the knife edge of the walls of the larger recess therein.

5. The combination with a cutter bar having a headed member carried thereon, of a removable cutter blade having a stem disposed on the bar and formed with a recess receiving the headed member, the said stem having a larger curved recess in its opposite side edge with the walls double beveled to produce a sharpened edge, and a rotatable cam carried by the bar and having a peripheral groove receiving the said edge of the walls of the larger recess, said cam being formed with a resilient finger which is compressible against the walls of the larger recess to frictionally bind thereagainst and maintain the blade in position.

In testimony whereof, I affix my signature, in the presence of two witnesses.

CHARLES B. WHITMOYER

Witnesses:
D. W. BUFFINGTON.
C. F. DYKINS.